United States Patent Office 3,577,550
Patented May 4, 1971

---

3,577,550
N-(PHENOXY)PHENYL-SALICYLAMIDES AND
THEIR UTILIZATION AS MOLLUSCIDIDES
Clarence L. Moyle, Clare, Mich., assignor to The Dow
Chemical Company, Midland, Mich.
No Drawing. Filed May 2, 1968, Ser. No. 726,205
Int. Cl. A01n 9/20
U.S. Cl. 424—324                                    3 Claims

ABSTRACT OF THE DISCLOSURE

Novel N-(phenoxy)phenyl-salicylamides and their preparation by reaction between a salicylic acid, phosphorus trichloride and a phenoxyaniline. They are useful as molluscidides.

SUMMARY OF THE INVENTION

This invention concerns the new compounds, N-(phenoxy)phenyl-salicylamides, represented by the formula

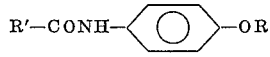

In the above and succeeding formulas, R represents phenyl and substituted phenyl wherein the substituents are selected from halo, loweralkyl, loweralkoxy, nitro and trifluoromethyl; R' represents 2-hydroxyphenyl and substituted 2-hydroxyphenyl wherein the substituents are selected from halo, loweralkyl, loweralkoxy, nitro and trifluoromethyl and wherein the central ring represents phenylene and substituted phenylene wherein the substituents are selected from halo, loweralkyl, lower-alkoxy, nitro and trifluoromethyl, no more than a total of two of which substituent groups are nitro or trifluoromethyl.

In the present specification and claims, the terms "loweralkyl" and "loweralkoxy" are employed to represent groups containing 1, and 2, and 3, and 4 carbon atoms, and from 1, to 2, to 3, to 4 carbon atoms, such as methyl, ethyl, propyl, isopropyl, butyl, isobutyl, tertiary butyl, methoxy, ethoxy, propoxy, butoxy, isobutoxy and tertiary butoxy; and the term "halo" to represent fluoro, chloro, bromo and iodo.

The compounds are high melting solids which are soluble in common organic solvents such as acetone and benzene and slightly soluble in water. They are useful as molluscidides.

Representative N-(phenoxy)phenyl-salicylamides of the present invention include

4'-phenoxy-salicylanilide,
3-nitro-4'-phenoxy-salicylanilide,
3-ethyl-3'-trifluoromethyl-4'-phenoxy-salicylanilide,
3-isopropyl-3'-nitro-4'-phenoxy-salicylanilide,
5-isobutyl-3',5'-diethoxy-4'-phenoxy-salicylanilide,
5-ethoxy-3'-trifluoromethyl-4'-phenoxy-salicylanilide,
3-bromo-3',5'-dimethyl-4'-(p-nitrophenoxy)-salicylanilide
3-trifluoromethyl-5'-chloro-2'-(p-ethoxyphenoxy)-salicylanilide and
3'-nitro-2'-(p-nitrophenoxy)-salicylanilide.

DETAILED DESCRIPTION OF THE INVENTION

The N-(phenoxy)phenyl-salicylamides of this invention are prepared by reacting together salicylic acid or a substituted salicylic acid, R'COOH (salicylic acid reactant) and a phenoxyaniline or substituted phenoxyaniline,

or preferably the hydrochloride of such a phenoxyaniline, (phenoxyaniline reactant) and phosphorus trichloride, conveniently in an organic liquid reaction medium. The liquid reaction medium advantageously is an aromatic hydrocarbon or a mixture of two or more aromatic hydrocarbons or a halogenated aromatic hydrocarbon or a mixture of two or more halogenated aromatic hydrocarbons or a mixture of one or more aromatic hydrocarbons and one or more halogenated aromatic hydrocarbons, e.g., benzene, toluene, xylene, mixtures thereof, chlorobenzene, chlorotoluene, chloroxylene, bromobenzene, bromotoluene, bromoxylene, iodobenzene, iodotoluene, iodoxylene or mixtures of such haloaromatics, or mixtures of one or more of such haloaromatics with one or more of said aromatic hydrocarbons. The reaction goes forward when the reactants are employed in any amounts. The reaction consumes in substantially equimolar amounts the salicylic acid reactant and the phenoxyaniline reactant and substantially one-third molar proportion of phosphorus trichloride reactant per mole salicylic reactant, and the use of such proportions is preferred. The reaction between the salicyclic acid reactant, phosphorus trichloride and phenoxyaniline reactant proceeds at a temperature which liberates HCl, conveniently between about 50° C. and the boiling point of the reaction mixture and is preferably completed at a temperature between about 80° and 125° C. under reflux. Upon completion of the reaction, the desired N-(phenoxy) phenyl-salicylamide is separated from the reaction mixture in a conventional manner, e.g., by filtration and recrystallization.

In a convenient manner for carrying out the reaction, the salicylic acid reactant, phosphorus trichloride and phenoxyaniline reactant are brought together in a liquid reaction medium as described, with agitation and heating to a temperature sufficient to liberate HCl, conveniently between about 50° C. and the boiling point of the reaction mixture and under reflux. The rate of the reaction is controlled by regulating the rate of heating. The reaction is completed when the evolution of hydrogen chloride ceases. The product is then separated and recovered in a conventional manner, such as by filtration and recrystallization.

The following examples describe completely representative specific embodiments and the best modes contemplated by the inventor for carrying out the invention in the novel products herein, their method of preparation and their method of use.

EXAMPLE 1

Preparation of 3,5-dibromo-4'-phenoxysalicylanilide 11.85 grams (0.04 mole) 3,5 - dibromosalicylic acid (M.P. 224.7–225.8° C.) and 7.35 grams (0.04 mole) 4-phenoxyaniline (M.P. 86–88° C.) are placed in a flask with 50 milliliters chlorobenzene and stirred during the dropwise addition of 1.28 milliliters (0.014 mole) phosphorus trichloride. The mixture then is heated to 120–130° C. for 2 hours. The hot mixture is poured into 275 milliliters 98–99° C. naphtha. The resulting mixture containing the crude product is cooled and filtered. The product is purified by recrystallization from 100 milliliters boiling acetic acid diluted with 15 milliliters water while hot. The recrystallized product melts at 154–154.5° C. It has a grey color which is removed by treatment with Norite activated charcoal. Its IR spectrum is consistent with the stated structure.

EXAMPLE 2

Preparation of 3,5-dibromo-3'-chloro-4'-phenoxy-salicylanilide 20.8 grams (0.07 mole) 3,5-dibromosalicylic acid and 18 grams (0.07 mole) 3-chloro-4-phenoxyaniline hydrochloride are placed in a flask with 100 milliliters chlorobenzene. The mixture is stirred and heated at 94–96° C. during the dropwise addition of 2.6 milliliters (0.0299 mole) PCl₃. The reaction mixture is heated to 125–130° C. with stirring for 2.25 hours. The hot solution is decanted into 400 milliliters 98–99° C. naphtha. The crude product is isolated as described in Example 1 and recrystallized from 125 milliliters boiling acetic acid to which is added 20 milliliters hot water. The resulting crystalline product has a pale tan color and melts at 149–150° C.

The following compounds of the present invention are prepared in accordance with the methods herein described. The substituents of the product molecules are with reference to the following graphic representation:

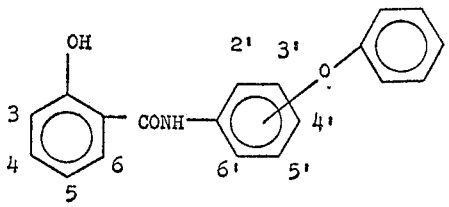

3,5 - dibromo - 3' - chloro - 6' - (p - chlorophenoxy)-salicylanilide, molecular weight 531.8, by reacting 3,5-dibromosalicylic acid and 3 - chloro - 6 - (p - chlorophenoxy)-aniline hydrochloride, (with phosphorus trichloride[1]).

5 - chloro - 4' - phenoxy - salicylanilide, melting at 188.5–189° C., by reacting 5-chlorosalicylic acid and 4-phenoxyaniline hydrochloride.

3 - methyl - 5 - bromo - 3' - chloro - 6' - (p - chlorophenoxy)salicylanilide, molecular weight 466.9, by reacting 3-methyl - 5 - bromosalicylic acid and 3 - chloro - 6-(p-chlorophenoxy)aniline hydrochloride.

3,5 - dichloro - 4' - phenoxy - salicylanilide, melting at 111–112° C., by reacting 3,5-dichlorosalicylic acid and 4-phenoxyaniline hydrochloride.

3,5 - dibromo - 3' - methyl - 6' - (p - chlorophenoxy)-salicylanilide, molecular weight 511.3, by reacting 3,5-dibromosalicylic acid and 3-methyl-6-(p-chlorophenoxy)-aniline hydrochloride.

5 - bromo - 4' - phenoxy - salicylanilide, melting at 204.5–205° C., by reacting 5-bromo-salicylic acid and 4-phenoxyaniline hydrochloride.

5 - bromo - 3 - iodo - 4' - (p - methylphenoxy)-salicylanilide, molecular weight 523.8, by reacting 5-bromo-3-iodosalicylic acid and 4-(p-methylphenoxy)aniline hydrochloride.

4 - ethoxy - 5' - (m,m' - dichlorophenoxy) - salicylanilide, molecular weight 418, by reacting 4-ethoxy-salicylic acid and 3-(m,m'-dichlorophenoxy)aniline hydrochloride.

3 - methyl - 5 - bromo - 3' - chloro - 4' - phenoxy-salicylanilide, melting at 124° C., by reacting 3-methyl-5-bromo-salicylic acid and 3-chloro-4-phenoxyaniline hydrochloride.

3,5 - diiodo - 6' - methoxy - 4' - (p - chlorophenoxy)-salicylanilide, molecular weight 621.3, by reacting 3,5-diiodosalicylic acid and 2-methoxy-4-(p-chlorophenoxy)-aniline hydrochloride.

3 - methyl - 5 - bromo - 5' - chloro - 2' - (p - chlorophenoxy)salicylanilide, melting at 177–177.5° C., by reacting 3-methyl-5-bromo-salicylic acid and 5-chloro-2-(p-chlorophenoxy)aniline hydrochloride.

5 - bromo - 3 - iodo - 4' - (o - methoxy - p - methylphenoxy)salicylanilide, molecular weight 553.8, by reacting 5-bromo-3-iodosalicylic acid and 4-(o-methoxy-p-methylphenoxy)aniline hydrochloride.

3,5 - diisopropyl - 3' - chloro - 4' - phenoxy - salicylanilide, melting at 108–109° C., by reacting 3,5-diisopropyl-salicylic acid and 3-chloro-4-phenoxyaniline hydrochloride.

5 - bromo - 3 - nitro - 3' - chloro - 6' - phenoxy - salicylanilide, molecular weight 463.4, by reacting 5-bromo-3-nitrosalicylic acid and 3-chloro-6-phenoxyaniline hydrochloride.

5 - bromo - 3' - chloro - 4' - phenoxy - salicylanilide, melting point 198.3° C., by reacting 5-bromosalicylic acid and 3-chloro-4-phenoxyaniline hydrochloride.

3,5 - dibromo - 3' - phenoxy - salicylanilide, melting at 106–107° C., by reacting 3,5-dibromosalicylic acid and 3-phenoxyaniline hydrochloride.

5 - bromo - 3 - nitro - 4' - nitro - 2' - (p - chlorophenoxy)salicylanilide, molecular weight 508.4, by reacting 5-bromo-3-nitrosalicylic acid and 2-(p-chlorophenoxy)-4-nitroaniline hydrochloride.

3,5 - dibromo - 2' - chloro - 4' - phenoxy - salicylanilide, melting at 153–153.5° C., by reacting 3,5-dibromosalicylic acid and 2-chloro-4-phenoxy-aniline hydrochloride.

3,5 - dibromo - 4' - (p - chlorophenoxy) - salicylanilide, melting at 173.5–174.5° C., by reacting 3,5-dibromo-salicylic acid and 4-(p-chlorophenoxy)aniline hydrochloride.

3 - bromo - 4' - (o - chloro - p - nitrophenoxy) - salicylanilide, molecular weight 463.4, by reacting 3-bromosalicylic acid and 4-(o-chloro-p-nitrophenoxy)aniline hydrochloride.

3,5 - dibromo - 5' - chloro - 2' - (p - chlorophenoxy)-salicylanilide, melting point 189.5° C., by reacting 3,5-dibromosalicylic acid and 5-chloro-2-(p-chlorophenoxy)-aniline hydrochloride.

5 - trifluoromethyl - 4' - (p - chlorophenoxy) - salicylanilide, molecular weight 407.5, by reacting 5-trifluoromethylsalicylic acid and 4-(p-chlorophenoxy)aniline hydrochloride.

3-iodo-5-bromo-3'-chloro - 4' - phenoxy-salicylanilide, melting at 167.5–168° C., by reacting 3-iodo-5-bromo-salicylic acid and 3-chloro-4-phenoxyaniline hydrochloride.

3-nitro-3'-trifluoromethyl - 6' - phenoxy-salicylanilide, molecular weight 418, by reacting 3-nitrosalicylic acid and 3-trifluoromethyl-6-phenoxyaniline hydrochloride.

3,5-diiodo-4'-phenoxy-salicylanilide, melting at 175.5–176° C., by reacting 3,5-diiodosalicylic acid and 4-phenoxyaniline hydrochloride.

2' - chloro-5'-(o-chloro-p-trifluoromethylphenoxy)salicylanilide, molecular weight 442, by reacting salicylic acid and 2 - chloro-5-(o-chloro-p-trifluoromethylphenoxy)aniline hydrochloride.

3,5-diiodo-3'-chloro-4' - phenoxy-salicylanilide, melting at 150.5–151° C., by reacting 3,5-diiodosalicylic acid and 3-chloro-4-phenoxyaniline hydrochloride.

3,5-diiodo - 5' - chloro - 2' - (p-chlorophenoxy)-salicylanilide, melting at 194.5–196° C., by reacting 3,5-diiodosalicylic acid and 5-chloro-2-(p-chlorophenoxy)-aniline hydrochloride.

3-bromo-5-nitro - 4' - methyl - 3' - (p-methylphenoxy)-salicylanilide, molecular weight 456.9, by reacting 3-bromo-5-nitrosalicylic acid and 4'-methyl-3'-(p-methylphenoxy)aniline hydrochloride.

4,6 - dibromo - 3,5 - dichloro - 3' - chloro - 4' - phenoxy-salicylanilide, melting at 211.5–212° C., by reacting 3,5-dichloro-4,6-dibromosalicylic acid and 3-chloro-4-phenoxyaniline hydrochloride.

5-nitro - 4' - (o-trifluoromethyl-p-bromophenoxy)-salicylanilide, molecular weight 496.9, by reacting 5-nitrosalicylic acid and 4-(o-trifluoromethyl-p-bromophenoxy)aniline hydrochloride.

6'-trifluoromethyl - 4' - (m-trifluoromethylphenoxy)-salicylanilide, molecular weight 440.99, by reacting salicylic acid and 2-trifluoromethyl-4-(m-trifluoromethylphenoxy)aniline hydrochloride.

3-bromo-2'-methoxy - 6' - (m-nitro-p-methylphenoxy)-salicylanilide, molecular weight 472.9, by reacting 3-bromosalicyclic acid and 2-methoxy-6-(m-nitro-p-methylphenoxy)aniline hydrochloride.

---
[1] The parenthetic expression, a reactant will be understood as present in each preparation, its omission hereafter being in the interest of brevity.

3-iodo-5-bromo-2'-methoxy - 4' - (p-methoxyphenoxy)-salicylanilide, molecular weight 569.8, by reacting 3-iodo-5-bromosalicylic acid and 2-methoxy-4-(p-methoxyphenoxy)aniline hydrochloride.

The products of this invention are useful for the control of mollusks. In controlling mollusks, any technique may be used so long as mollusks and their habitats are contacted with one or more toxicants of the present invention at a cidal concentration. Also, the exact time of exposure is dependent upon a variety of factors including water temperature, the particular type of mollusk to be exterminated, expected or known duration of mollusk contact with treated water, nature and content of organic matter in, or in contact with, water, if any; incidence of sunlight, daylight length and other seasonable factors. In accomplishing the purpose of the present invention, the toxicant is applied to the habitat and/or food supply of the mollusk so that the mollusk ingests a molluscicidal amount of the toxicant. When it is desired to depopulate an area of mollusks for an extended period of time, the toxicant or toxicants can be applied at intervals in order to control any population which has become established subsequent to the preceding application. It may also be desirable to maintain the toxicant at a continuous low molluscicidal level of concentration. Such low levels are conveniently maintained in bodies of water by dispersing the toxicant in water in the form of pellets prepared with one or more water-insoluble, or slowly-soluble, carrier materials which disperse, dissolve or yield the toxicant slowly by leaching to the water over a period of time. Certain of the mollusks such as some of the snails are dependent upon a body of water. A mollusk is regarded herein as being dependent upon a body of water if it is aquatic or amphibious.

In general, good controls of mollusks are obtained in still water when a concentration of from about 2 to about 5 parts toxicant per million parts water by weight, are employed. When it is desired to obtain a quick kill of aquatic mollusks, as may be necessary in rivers and streams with moderate to rapid current, higher concentrations up to as high as 100 or 500 parts toxicant per million parts water by weight can be employed. When a quiescent body of water is to be treated under relatively warm water temperature conditions (water about 80° F. at the surface, for example) and prolonged contact is possible, concentrations maintained as low as 0.5 part toxicant per million parts water can be used, with contact durations as great as several weeks. However, when the preferred 3,5 - dihalo - 4' - phenoxysalicylanilides, 3,5-dihalo - 4' - (p-halophenoxy)salicylanilides, 3,5-dihalo-5'-halo-2'-(p-halophenoxy)salicylanilides, and 3,5-dihalo-3'-halo-4'-phenoxysalicylanilides are employed in such operations, concentrations as low as 0.2–0.25 part per million parts by weight of water are molluscicidal.

Under field conditions, in still water, concentrations typically employed are on the order of 2 parts of toxicant per million parts of water by weight. Where toxicity to other animal forms is not a factor, higher concentrations up to 10 or more parts per million may be employed. While concentrations as high 500 parts per million can be employed, such high concentrations are not usually necessary. Such concentrations give good control of mollusks.

In general, methods of civil and hydraulic engineering can be applied for obtaining sufficiently accurate estimates of water volumes and flows in natural bodies of water in order to calculate proper dosages of toxicants. Moreover, most aquatic mollusks, even truly aquatic fresh water snails, tend to live in shallow waters only or in the upper parts and near the shores of deeper water; hence, uniform dispersion of the toxicant throughout the entire body of water usually is not essential.

When it is desired, as it often is, to effect control of such mollusks with a minimum of side effects upon other components of the entire biota, and in particular to avoid harm to fish, littoral plants, warm-blooded animals, and the like, then the combination of concentration of toxicant and exposure time, will be chosen to represent a minimum molluscicidal dosage. In standing bodies of water with little or no inflow and outflow, it is possible accurately to control the concentration. However, duration of exposure will depend upon time elapsed until reaction and precipitation (together with biodegradation and other factors) have detoxified the water. Detoxication will, in turn, depend upon many local natural factors. In running bodies of water in which the current moves at a known rate, the duration of exposure at an initial site can be controlled with a fair degree of accuracy.

Known techniques for the chemical treatment of bodies of water can be used, such as contant flow or metering devices, or aerial application or application from a small boat, making use of the known solubility, dispersibility, and the like, of the toxicant substance employed.

When, through tidal action, drainage, control of dam spillways and the like, the mollusks and/or their eggs are exposed, the wet, exposed land bearing a mollusk population and/or egg masses can be sprayed or dusted with formulations prepared as for routine agricultural application. The compounds of the present invention can also be applied to plants and plant parts where the mollusks can ingest the toxicant.

Most particularly, the toxicants of this invention are dispersible in water and can be distributed in, or over the water, wet land or plants to be treated, in the form of a dust of either the pure toxicant or the toxicant admixed with a diluent or adjuvant. Such diluent solid can be an inert substance such as infusorial earth, clay, talc, chalk, wood flour, or the like. The toxicant can be distributed in this kind of substance by grinding toxicant and diluent or adjuvant together, by grinding them separately and admixing, or by dispersing the toxicant in a liquid which is then dispersed in the solid with subsequent grinding after the lquid has been evaporated, if desired.

As carrier in coarsely particulate form adapted for slow release of toxicant, a porous fritted glass, or a porous fired clay can be used, into which the toxicant is dispersed by solvent solution, the solvent being thereafter removed by vaporization. Other such carriers are known. In addition, the toxicant materials of the present invention can be employed in granular compositions prepared in accordance with known granulating techniques to provide for the release of the toxicant over a prolonged period of time. Such known granulating techniques employ vegetable gums, shellac, etc.

Also the toxicant can be dispersed in water or organic solvents; in either case, but especially in the case of organic solvents, a wetting agent as emulsifying dispersant can be added. Such preparations are adapted to prompt and often spontaneous dispersion when added to water, as an emulsion of toxicant in water. For convenience in measuring out an employed amount, such preparations can be diluted with further organic liquid, or with water; or for convenience in shipment and storage, can be prepared as a concentrate in which the contained amount of toxicant approaches the theoretical maximum for the solvent-dispersant system employed. At dam spillways and the like, such high concentrations can be directly employed, relying upon water turbulence for mixing.

The quantity of toxicant per unit of preparation is not critical. So long as the preparation can be employed to distribute the toxicant in molluscicidal amounts in the habitat to be treated, good results are obtained. The concentration of toxicant in liquid concentrate compositions generally is from about 1 to 50 percent by weight. Concentrations up to 95 percent by weight oftentimes are conviently employed. In dusts, the concentration of the toxicant can be from about 1 to 10 percent by weight. In compositions to be employed as concentrates, the toxicant can be present in a concentration of from 5 to 98 percent by weight.

In representative operations, 3,5-dibromo-4'-phenoxysalicylanilide and 3,5-diiodo-4'-phenoxysalicylanilide, each at a concentration of 0.25 part by weight per million parts by weight of water gives 100 percent kills of *Australorbis glabratus*; while 3-methyl-5-bromo-4'-(p-chlorophenoxy)-salicylanilide and 3-methyl-5-bromo-5'-chloro-2'-(p-chlorophenoxy)-salicylanilide each at a concentration of 1.0 part per million are similarly molluscicidal.

The phenoxy aniline reactant starting materials are prepared in accordance with known procedures. In one manner, alkali metal phenate or a substituted phenate is reacted with an ar-chloronitrobenzene or substituted ar-chloronitrobenzene at a temperature which liberates alkali metal halide and forms a phenoxynitrobenzene, for example, at 100–150° C., and catalytically reducing the nitro group with hydrogen to an amino group, according to the mechanisms:

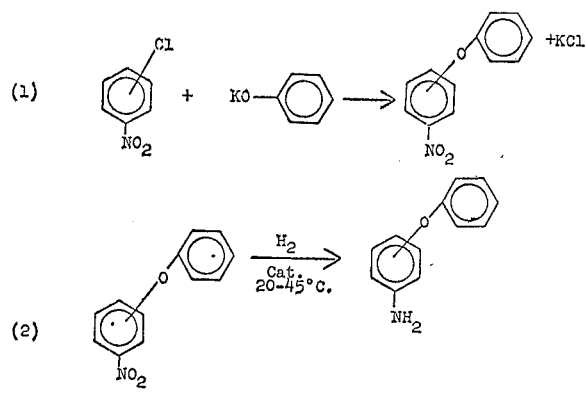

For example, potassium p-chlorophenate, 1.43 gram moles, is reacted with 0.5 gram mole of 1,2,4-trichloro-5-nitrobenzene by slowly heating to 75° C. in the presence of 0.5 gram copper catalyst to initiate reaction. When the exotherm subsides and the temperature has declined from 110 to 55° C., an additional 0.5 grams mole of the trichloronitrobenzene is added, with heating to 150° C. for two hours after the second exotherm has subsided. Product 4,5-dichloro-2-nitrophenyl-4-chlorophenyl ether is recovered by conventional solution and recrystallization, i.e., by solution in chloroform, water-washing treatment with activated charcoal, evaporation of the chloroform and recrystallization from propylene glycol methyl ether.

0.35 gram mole of the 4,5-dichloro-2-nitro-phenyl-4-chlorophenyl ether is transferred to a 2-liter Parr Pressure Apparatus provided with a stirrer, together with 800 milliliters absolute ethanol and 20 grams of 65 percent Raney nickel. The system is closed, flushed with hydrogen to remove air, and hydrogen under pressure of 500 p.s.i.g. is provided. The reaction commences when the stirrer is started. After the hydrogen pressure has dropped to 200 p.s.i.g. as the temperature rises gradually, it is raised again to 500 p.s.i.g. A maximum temperature of 45° C. is reached by the system. After hydrogenation is completed, pressure is released and the reaction mixture is filtered into 100 milliliters water containing 0.35 gram mole concentrated hydrochloric acid. The solution is concentrated until almost dry and product 4,5-dichloro-2-(p-chlorophenoxy)aniline as the hydrochloride is recovered by conventional recrystallization from aqueous ethanol.

Other phenoxyaniline reactants described herein are prepared in accordance with known procedures, such as are available in the multiple volumes of "Organic Syntheses," published by John Wiley and Sons, Inc.

The salicylic acid reactant starting materials are likewise prepared by known procedures; for example, phenol or a substituted phenol is carboxylated by reaction with carbon dioxide under pressure; or a salicylic acid or a substituted salicylic acid can be halogenated or nitrated. The introduction of substituent groups in phenol and salicylic acid for making starting materials for the products of this invention follows known procedures such as are available in the literature, for example, in the multiple volumes of "Organic Syntheses."

What is claimed is:

1. The method useful in controlling mollusks which comprises contacting mollusks and their habitats with a molluscicidal amount of one or more compounds corresponding to the formula:

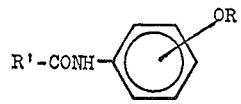

wherein R represents phenyl and substituted phenyl wherein the substituents are selected from the group consisting of halo, loweralkyl, loweralkoxy, nitro and trifluoromethyl; R' represents 2-hydroxyphenyl and substituted 2-hydroxyphenyl wherein the substituents are selected from the group consisting of halo, loweralkyl, loweralkoxy, nitro and trifluoromethyl; and wherein the central ring represents phenylene and substituted phenylene, wherein the substituents are selected from the group consisting of halo, loweralkyl, loweralkoxy, nitro and trifluoromethyl, with no more than a total of two of which substituents being nitro or trifluoromethyl.

2. The method of claim 1 wherein the contacting is carried out by dispersing the compound in a body of water in which mollusks are dependent.

3. The method of claim 2 wherein the compound is selected from the group consisting of at least one of 3,5-dibromo - 4' - phenoxysalicylanilide, 3,5 - dichloro-4'-phenoxy-salicylanilide, 3,5 - dibromo - 4' - (p-chlorophenoxy)-salicylanilide, 3,5-dibromo - 5' - chloro-2'-(p-chlorophenoxy)-salicylanilide, 3 - iodo - 5 - bromo-3'-chloro-4'-phenoxy-salicylanilide, 3,5 - diiodo-4'-phenoxysalicylanilide, 3,5-diiodo - 3' - chloro-4'-phenoxy-salicylanilide and 3,5-diiodo-5'-chloro - 2' - (p-chlorophenoxy)-salicylanilide.

References Cited
UNITED STATES PATENTS
3,375,160　3/1968　Early et al. _____ 260—559S
FOREIGN PATENTS
1,456,361　9/1966　France _____ 260—559S STANLEY J. FRIEDMAN, Primary Examiner V. D. TURNER, Assistant Examiner